United States Patent
Vos et al.

(10) Patent No.: US 8,209,068 B2
(45) Date of Patent: Jun. 26, 2012

(54) SYSTEMS AND METHODS FOR CONTROLLING DYNAMIC SYSTEMS

(75) Inventors: David William Vos, Delaplane, VA (US); Vladislav Gavrilets, Fairfax, VA (US); Michael Daniel Piedmonte, Warrenton, VA (US)

(73) Assignee: Rockwell Collins Control Technologies, Inc., Cedar Rapids, IA (US)

( * ) Notice: Subject to any disclaimer, the term of this patent is extended or adjusted under 35 U.S.C. 154(b) by 1170 days.

(21) Appl. No.: 11/628,114

(22) PCT Filed: Jun. 2, 2005

(86) PCT No.: PCT/US2005/019434
§ 371 (c)(1),
(2), (4) Date: Feb. 13, 2008

(87) PCT Pub. No.: WO2006/071258
PCT Pub. Date: Jul. 6, 2006

(65) Prior Publication Data
US 2008/0147254 A1    Jun. 19, 2008

Related U.S. Application Data

(60) Provisional application No. 60/576,020, filed on Jun. 2, 2004.

(51) Int. Cl.
*G05D 1/06*     (2006.01)
(52) U.S. Cl. ............... 701/8; 701/4; 244/181; 244/184
(58) Field of Classification Search .......... 701/3, 4, 701/5, 7, 8; 244/75.1, 181, 182, 184
See application file for complete search history.

(56) References Cited

U.S. PATENT DOCUMENTS

| | | | | |
|---|---|---|---|---|
| 4,914,598 A | * | 4/1990 | Krogmann et al. | 701/11 |
| 5,169,090 A | * | 12/1992 | Wright et al. | 244/17.13 |
| 5,400,033 A | * | 3/1995 | Hablani | 342/95 |
| 5,406,488 A | * | 4/1995 | Booth | 701/1 |
| 5,617,316 A | * | 4/1997 | Fogler et al. | 701/5 |
| 5,875,993 A | * | 3/1999 | Weiss et al. | 244/3.22 |
| 5,894,323 A | * | 4/1999 | Kain et al. | 348/116 |
| 6,061,611 A | * | 5/2000 | Whitmore | 701/4 |
| 6,088,653 A | * | 7/2000 | Sheikh et al. | 701/470 |
| 6,647,352 B1 | * | 11/2003 | Horton | 702/151 |
| 6,860,451 B1 | * | 3/2005 | Wang | 244/164 |
| 7,136,751 B2 | * | 11/2006 | Pinto et al. | 701/470 |
| 7,216,055 B1 | * | 5/2007 | Horton et al. | 702/153 |
| 7,289,906 B2 | * | 10/2007 | van der Merwe et al. | 701/472 |
| 7,418,364 B1 | * | 8/2008 | Horton et al. | 702/153 |
| 2004/0030464 A1 | * | 2/2004 | Buchler et al. | 701/4 |

(Continued)

*Primary Examiner* — Helal A Algahaim
(74) *Attorney, Agent, or Firm* — Finnegan, Henderson, Farabow, Garrett & Dunner, L.L.P.

(57) ABSTRACT

A control system (12) for controlling velocity and attitude of a dynamic system (20) includes a velocity controller configured to receive a desired velocity command and output a velocity error in the form of Euler angle commands to an attitude controller system. The attitude controller system includes a converter (14) configured to receive the Euler angle commands and output a desired quaternion based on the Euler angle commands. The attitude controller system further includes an attitude error generator (16) configured to receive the desired quaternion and an estimated quaternion indicative of an estimated velocity and attitude of the dynamic system (20) and to output attitude errors associated with the dynamic system (20). The attitude controller system also includes an attitude controller (18) configured to receive the attitude errors and to output error commands to the dynamic system (20) based on the attitude errors.

53 Claims, 5 Drawing Sheets

U.S. PATENT DOCUMENTS

2004/0111194 A1* 6/2004 Wie .............................. 701/13
2004/0140401 A1* 7/2004 Yamashita .................. 244/165
2005/0040985 A1* 2/2005 Hudson et al. ........... 342/357.02
2005/0060093 A1* 3/2005 Ford et al. .................... 701/214

* cited by examiner

SYSTEMS AND METHODS FOR CONTROLLING DYNAMIC SYSTEMS

RELATED APPLICATIONS

This application claims the benefit of priority under 35 U.S.C. §119(e) of U.S. Provisional Application No. 60/576,020, filed on Jun. 2, 2004, the disclosure of which is incorporated herein by reference.

FIELD OF THE INVENTION

The present disclosure relates to systems and methods for controlling dynamic systems. In particular, the present disclosure relates to systems and methods for controlling velocity and attitude of a vehicle. For example, the present disclosure relates to control architecture that may be used for controlling a vehicle at any attitude, given commands in a fixed reference system, by using Euler angles as a desired command and converting the Euler angles into a desired quaternion for use by an attitude feedback control system, such as, for example, an all-attitude feedback control system. In addition, the present disclosure relates to a pilot or outer-loop controller configured to control North, East, and Down (NED) velocities. For example, for an outer-loop controller, the disclosure relates to a feedback structure configured to control a vehicle by producing Euler angle commands that may be used by an attitude controller, such as, for example, the above-mentioned attitude controller. In addition, the present disclosure relates to providing a mechanism for using an outer-loop controller with an attitude controller at any vehicle attitude by re-defining an Euler angle sequence, thereby eliminating singularities in the Euler angles. The disclosure is applicable to dynamic systems such as, for example, vehicles that maneuver in 3-dimensional space at any attitude and to vehicles that maneuver at limited attitudes.

BACKGROUND OF THE INVENTION

Some conventional feedback control strategies for flying air vehicles may use Euler pitch as a mechanism to control airspeed and Euler roll to control bank angle. For hovering vehicles, such as, for example, a helicopter, body pitch and body roll are used for controlling forward and side speed. In some systems, Euler pitch error may be mapped to a control surface that generates a body pitch moment. If, however, the vehicle rolls ninety degrees, using a surface that generates pitch moment will render incorrect results if Euler pitch is the feedback variable. If the vehicle pitches up ninety degrees, Euler angles reach a singularity where Euler roll and Euler heading are not uniquely defined.

An example of a helicopter flight control system is described in U.S. Pat. No. 5,169,090, which attempts to overcome the above-mentioned drawbacks by synchronizing a sensed attitude signal and a desired attitude signal as the pitch attitude of the helicopter approaches ninety degrees to compensate for the Euler singularities. An example of a model-following aircraft control system is described in U.S. Pat. No. 5,617,316, which attempts to overcome the above-mentioned drawbacks by integrating a commanded roll rate in Euler coordinates to provide a bank angle command, which has actual bank angle subtracted therefrom to provide a command error that is converted back to aircraft body coordinates for use, so long as the pitch attitude of the aircraft does not approach zenith or nadir. While the absolute value of the pitch attitude exceeds 85 degrees, the last error generated before exceeding 85 degrees is converted to body coordinates for use by the aircraft, and the initial integrated value of attitude command for use when the pitch angle reverts below 85 degrees is formed as the sum of the last error and the actual attitude angle of the aircraft.

In each of these patents, however, the vehicle being controlled cannot fly nominally at a ninety degree Euler angle for a sustained amount of time, and once another axis such as Euler roll is rotated by ninety degrees, the control actions become incorrect. For example, once a vehicle such as an airplane has banked to ninety degrees, Euler pitch should be controlled by the rudder, where conventional airplane controllers would use the elevator.

In U.S. Pat. No. 5,875,993, a quaternion vector is used to control a thrust vectoring system by converting velocity errors forward and sideways to Euler commands, with Euler roll being a free changing variable. Side velocity error drives Euler heading command and forward velocity error drives Euler pitch command. The output quaternion command is then controlled against a quaternion measured by inertial sensors by applying feedback gain directly to three of the quaternion elements. A method of commanding either Euler angles or forward and North and East velocities and controlling a body attitude of a vehicle at any attitude is disclosed. Once the operating attitude limits are removed, however, Euler angles are no longer adequate control variables. Some have tried to circumvent this problem by using body sensed rates and integrating the body sensed rates over time to achieve body axes attitudes. Although this may render acceptable results under some circumstances, when the absolute attitude is unknown and limits on the attitudes cannot be enforced, this may not be acceptable. Since limiting the operational attitudes of air vehicles is a viable and acceptable option, limited angle controllers fly on many airplanes. For some air vehicles, however, it may be desirable to fly in many different areas of the flight envelope. For example, for a vertical takeoff and landing vehicle that also transitions to forward flight and flies like an airplane, it may be desirable to fly in many different areas of the flight envelope. In such case, limiting the attitudes of the vehicle in flight is not possible.

There may exist a desire to overcome one or more of the above-mentioned drawbacks. The exemplary disclosed systems and methods may seek to satisfy one or more of the above-mentioned drawbacks. Although the presently disclosed systems and methods may obviate one or more of the above-mentioned drawbacks, it should be understood that some aspects of the disclosed systems and methods might not necessarily obviate them.

SUMMARY OF THE INVENTION

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes a control system for controlling velocity and attitude of a dynamic system. The control system includes a velocity controller configured to receive a desired velocity command and output a velocity error in the form of Euler angle commands to an attitude controller system. The control system further includes an attitude controller system. The attitude controller system includes a converter configured to receive the Euler angle commands and output a desired quaternion based on the Euler angle commands. The attitude controller system further includes an attitude error generator configured to receive the desired quaternion and an estimated quaternion indicative of an estimated attitude of the dynamic system and to output attitude errors associated with the dynamic system. The attitude controller system also includes an attitude controller configured to receive the attitude errors and to output error commands to the dynamic system based on the attitude errors. The error commands are configured to reduce the attitude errors and the velocity errors.

According to another aspect, an attitude controller system for controlling attitude of a dynamic system includes a converter configured to receive a velocity error in the form of Euler angle commands and output a desired quaternion based on the Euler angle commands. The attitude controller system further includes an attitude error generator configured to receive the desired quaternion and an estimated quaternion indicative of an estimated attitude of the dynamic system, and is configured to output attitude errors associated with the dynamic system. The attitude controller system also includes an attitude controller configured to receive the attitude errors and to output error commands to the dynamic system based on the attitude errors. The error commands are configured to reduce the attitude errors and the velocity errors.

In still a further aspect, a method of controlling velocity and attitude of a dynamic system includes converting a velocity error associated with the dynamic system into Euler angle commands. The method further includes converting the Euler angle commands into a desired quaternion and generating attitude errors associated with the dynamic system based on the desired quaternion and an estimated quaternion indicative of an estimated attitude of the dynamic system. The method also includes controlling the velocity and attitude of the dynamic system to reduce the attitude errors and the velocity errors.

Automatic flight control for vehicles that require maneuvering at any attitude requires a solution that works in the NED coordinate system (our world) and controls the vehicle in an absolute attitude sense (the vehicle's world). Sensors include on the vehicle, for example, gyros, accelerometers, GPS, and compasses, may be combined to estimate the attitude of the vehicle and NED velocities. Using a combined sensor feedback, a control algorithm is derived, which normally would have a limited attitude envelope due to limitations from Euler angles.

As used herein, the term "algorithm" means a set of equations and/or logic steps that may be used to describe how estimated states may be transformed into deflections of control surfaces.

According to some aspects, an exemplary attitude controller system may include an attitude control algorithm, for example, an all-attitude control algorithm, which allows commands to be given in NED axes, and which may provide direct control of the absolute attitude of a vehicle through attitude errors. A quaternion set may describe the absolute attitude at any instant in time of any vehicle. The attitude controller system may track the desired quaternion set by applying control gains to the error between the desired and actual quaternion set. An outer-loop controller and/or pilot may command three Euler angles based on errors in desired versus actual velocity. Euler attitude commands may be converted into a desired quaternion set. For a forward flying air vehicle, forward velocity may be controlled by commanding Euler pitch. Since three Euler angles may be required for full attitude control, this allows Euler roll to be set independently, resulting in a controller algorithm that can fly at any orientation in roll. For a hovering vehicle, a similar feedback architecture can be used to control both forward and side velocity by commanding Euler pitch and Euler roll, with freedom to specify any Euler heading.

Aside from the structural and procedural arrangements set forth above, the invention could include a number of other arrangements, such as those explained hereinafter. It is to be understood, that both the foregoing description and the following description are exemplary.

BRIEF DESCRIPTION OF THE DRAWINGS

The accompanying drawings are incorporated in and constitute a part of this specification. The drawings illustrate exemplary embodiments of the invention and, together with the description, serve to explain some principles of the invention. In the drawings.

DESCRIPTION OF EXEMPLARY EMBODIMENTS

Figure 1:
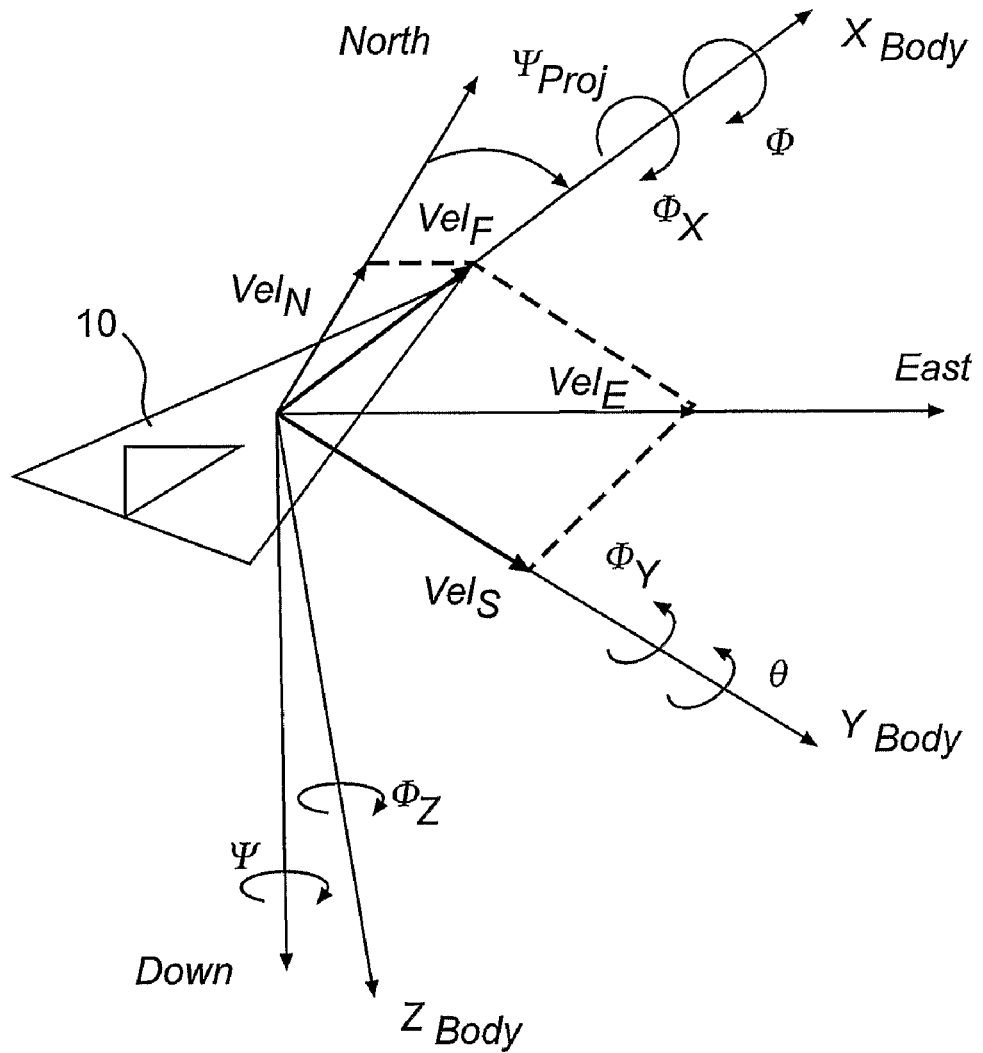
FIG. 1 is a schematic depiction of an exemplary vehicle axes convention with a nose of the vehicle in a horizontal orientation.

Reference will now be made in detail to some possible exemplary embodiments of the invention, examples of which are illustrated in the accompanying drawings. Wherever possible, the same reference numbers are used in the drawings and the description to refer to the same or like parts.

In a dynamic system for which it is desirable to provide automatic control in relation to 3-axes, a set of sensors, for example, gyros, accelerometers, magnetometer, and/or other state-bearing sensors may be used. For example, a dynamic system may include a dynamic vehicle that may be controlled in relation to 3 axes, and the sensors may be sometimes (but not always) combined to produce estimated states that may be used by a controller algorithm to generate controller outputs. The controller algorithm may be defined by any set of mathematical operations to convert between sensor inputs and control actuation outputs. For a vehicle such as, for example, an airplane, the sensors may be combined in a navigation filter to render estimated states. For example, the estimated states may include vehicle attitude defined by a quaternion set, which may be represented by the following equation:

$$\vec{q} = [q_0 q_1 q_2 q_3]^T.$$

The estimated states may also include NED velocities and NED positions.

Figure 2:
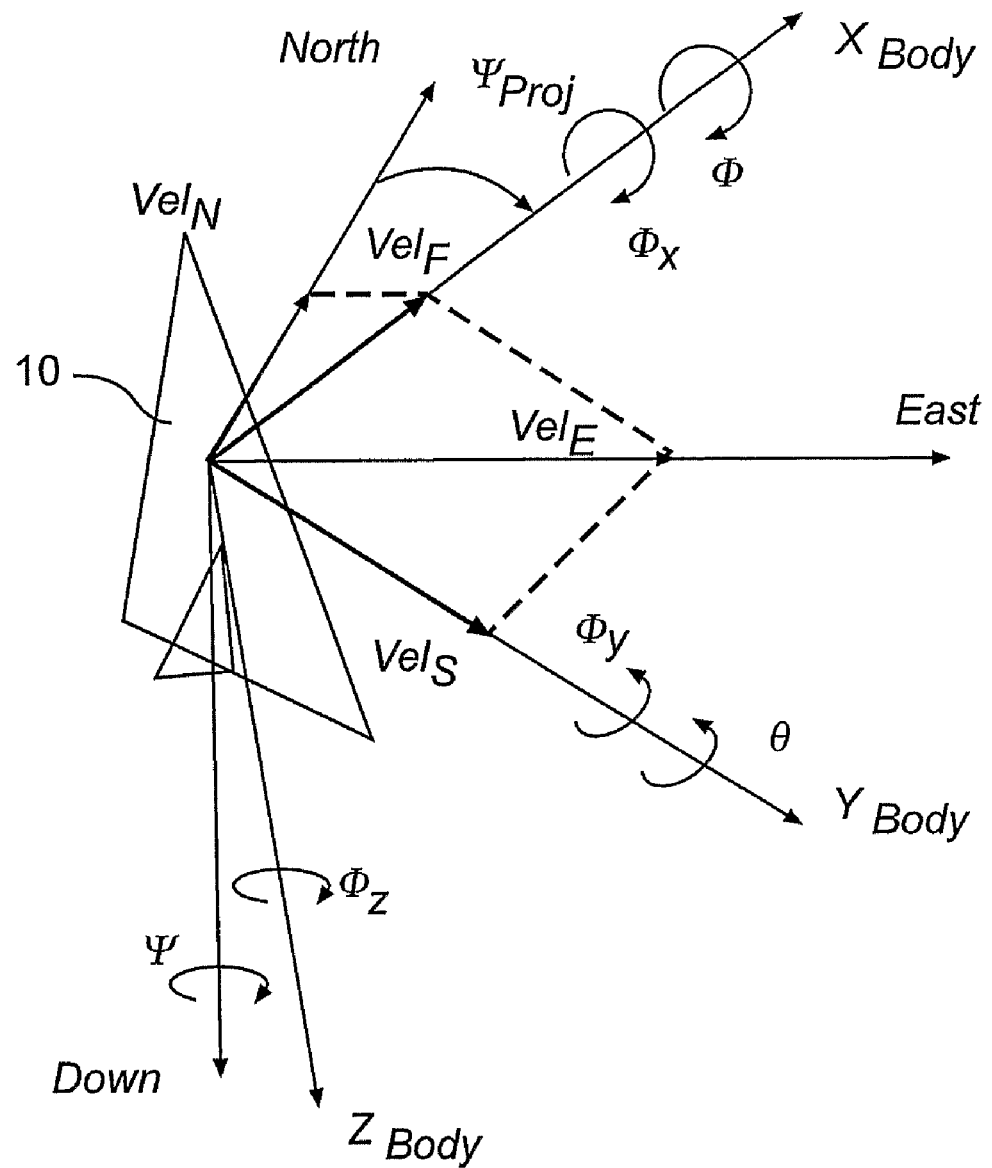
FIG. 2 is a schematic depiction of an exemplary vehicle axes convention with a nose of the vehicle in a vertical orientation.

Referring to FIGS. 1 and 2, these figures schematically depict exemplary axes conventions for a vehicle. FIG. 1 depicts an axes convention for a vehicle 10 having its nose in a horizontal orientation. As shown in FIG. 1, Euler angles may be defined by a sequence of heading, pitch, and then roll rotations to transform from NED axes to body axes.

FIG. 2 schematically depicts an axes convention for the vehicle 10 having its nose in a vertical orientation. As shown in FIG. 2, another set of Euler angles may be used when the vehicle's nose is near vertical to avoid singularities by redefining the body axes of the vehicle 10. In such case, Euler roll prescribes the body yaw angle. Although the Euler angles are discontinuous, the quaternion describes any attitude, so it can remain continuous, but it is, however, not unique.

The following description applies to any dynamic system (e.g., a vehicle) that may be controlled in relation to 3 axes that may be described by a quaternion. A quaternion is a 4-dimensional vector that may be used to completely describe the orientation of a vector in 3-dimensional space.

The simplest controller case may be an all-attitude controller, where attitude commands are given as Euler attitude commands. In such case, an operator or higher-level autopilot may generate Euler angle commands that may be tracked by a vehicle in 3-dimensional space. Attitude tracking may be performed by any number of techniques, including, for example, direct quaternion feedback error control, such as described by the following equation:

$$\vec{u} = K_P(\vec{\phi}_{err}) + K_I \int (\vec{\phi}_{err}) - K_D \frac{d}{dt}(\phi_{meas}).$$

The term $\vec{\phi}_{err}$ is a vector of attitude errors $[\phi_x, \phi_y, \phi_z]$, the term $K^{n \times 3}$ is the feedback gain matrix, and the term n is the number of control surfaces of the dynamic system. The quaternion error may be calculated using well known quaternion arithmetic.

Another method for attitude tracking includes using the quaternion error to generate body axes attitude errors. Regardless of how the attitude feedback law is defined, the method only needs to use the appropriate control actuation to track the desired quaternion vector in body axes. In the case of converting the quaternion error to body axes attitude errors, the result is that the body axes roll error is controlled by a roll moment generating surface, for example, an aileron; the body axes pitch error is controlled by a pitch moment generating surface, for example, an elevator; and the body axes yaw error is controlled by a yaw moment generating surface, for example, a rudder.

In cases for which the nose of the vehicle 10 is horizontal (nose horizontal) or the nose of the vehicle 10 is vertical (nose vertical), commands may be prescribed by Euler angle commands from a pilot or higher-level controller. For example, these commands may be prescribed as Euler pitch, Euler heading, and Euler roll. These three Euler angle commands may be used to generate the desired quaternion vector, according to the following equation:

$$\vec{q}_{desired} = \text{Euler2Quat}(\phi_{Cmd}, \theta_{Cmd}, \psi_{Cmd}).$$

The Euler2Quat function is a known function for converting from Euler angles to a quaternion.

Figure 3:
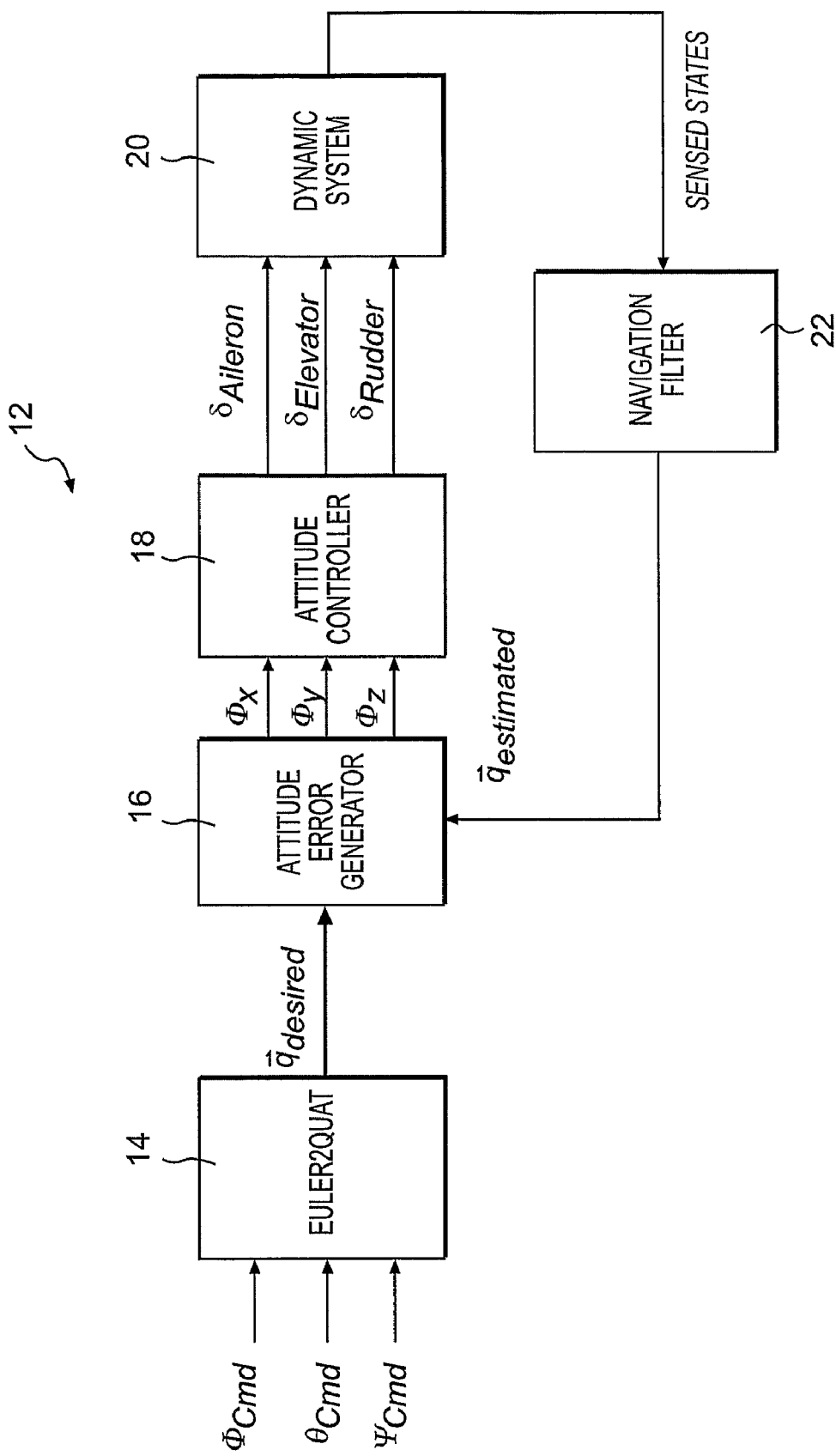
FIG. 3 is a schematic block diagram of an exemplary embodiment of an attitude controller system.

FIG. 3 depicts an exemplary embodiment of a control system 12, for example, a direct attitude controller system. The schematically-depicted block diagram for the control system 12 may be used on an exemplary vehicle such as an airplane flying nose horizontal or nose vertical.

In the exemplary control system 12 depicted in FIG. 3, Euler angle commands $\phi_{Cmd}$, $\theta_{Cmd}$, and $\psi_{Cmd}$ for Euler roll, Euler pitch, and Euler heading, respectively, are input into a converter 14. The converter 14 converts the Euler angle commands into a desired quaternion vector $\vec{q}_{desired}$. The desired and estimated quaternion vectors are input into the attitude error generator 16, which generates attitude errors $\phi_x$, $\phi_y$, and $\phi_z$ from desired and estimated attitude quaternion vectors using an attitude error method. Attitude errors $\phi_x$, $\phi_y$, and $\phi_z$ are input into attitude controller 18. In this fashion, Euler angles are not used directly for control. Rather, they are converted to true body axes attitude errors for control.

The attitude controller 18 may be any multivariable or single input single output attitude controller that commands $\delta_{Aileron}$ to generate a body roll moment, $\delta_{Elevator}$ to generate a body pitch moment, and $\delta_{Rudder}$ to generate body yaw moment. When, for example, the attitude controller 18 is designed using LTI'zation, some examples of which are described in commonly assigned U.S. Pat. No. 6,859,689, the subject matter of which is incorporated herein by reference, the attitude controller 18 may control the attitude of a vehicle across the entire operating envelope of the vehicle.

The $\delta_{Aileron}$, $\delta_{Elevator}$, and $\delta_{Rudder}$ commands may be input into the dynamic system 20, such as, for example, a vehicle, and sensed states may be input in a navigation filter 22 such that the estimated attitude quaternion vector $\vec{q}_{estimated}$ is input into the attitude error generator 16 in a closed-loop manner.

By commanding Euler angles, the pilot or higher-level autopilot (e.g., an autopilot for an unmanned air vehicle) may rotate Euler roll to any angle and maintain the same input control for Euler pitch. The attitude controller 18, by tracking the attitude commands, will convert any necessary inputs to the correct body attitude axes.

For example, consider a conventional airplane flying straight and level with Euler pitch command set to 10 degrees, Euler roll set to 0 degrees, and Euler heading set to 0 degrees. Let's assume the actual Euler pitch is 8 degrees, actual Euler roll is 0 degrees, and actual Euler heading is 0 degrees. The resulting surface deflections will be up elevator, zero rudder, and zero aileron. Now assume the pilot or higher-level autopilot commands Euler roll of 90 degrees, Euler pitch of 10 degrees, and Euler heading of 0 degrees. Assume the actual Euler roll is 90 degrees, actual Euler heading is 0 degrees, and actual Euler pitch is 8 degrees. The resulting surface deflections will be left rudder, zero elevator, and zero aileron. In this case, the rudder is acting like an elevator to the Euler pitch axis by controlling Euler pitch.

The attitude controller 18, by using Euler angle commands, allows a pilot or auto-pilot to control the vehicle's velocity directly with Euler pitch, regardless of the Euler roll angle. This may render it possible for the vehicle to fly a knife edge or inverted with no additional workload by the pilot or autopilot.

For a vehicle that can fly at any attitude, the axes convention may be switched such that the X-axis up Euler angle definition is used, for example, as shown in FIG. 2.

Figure 4:
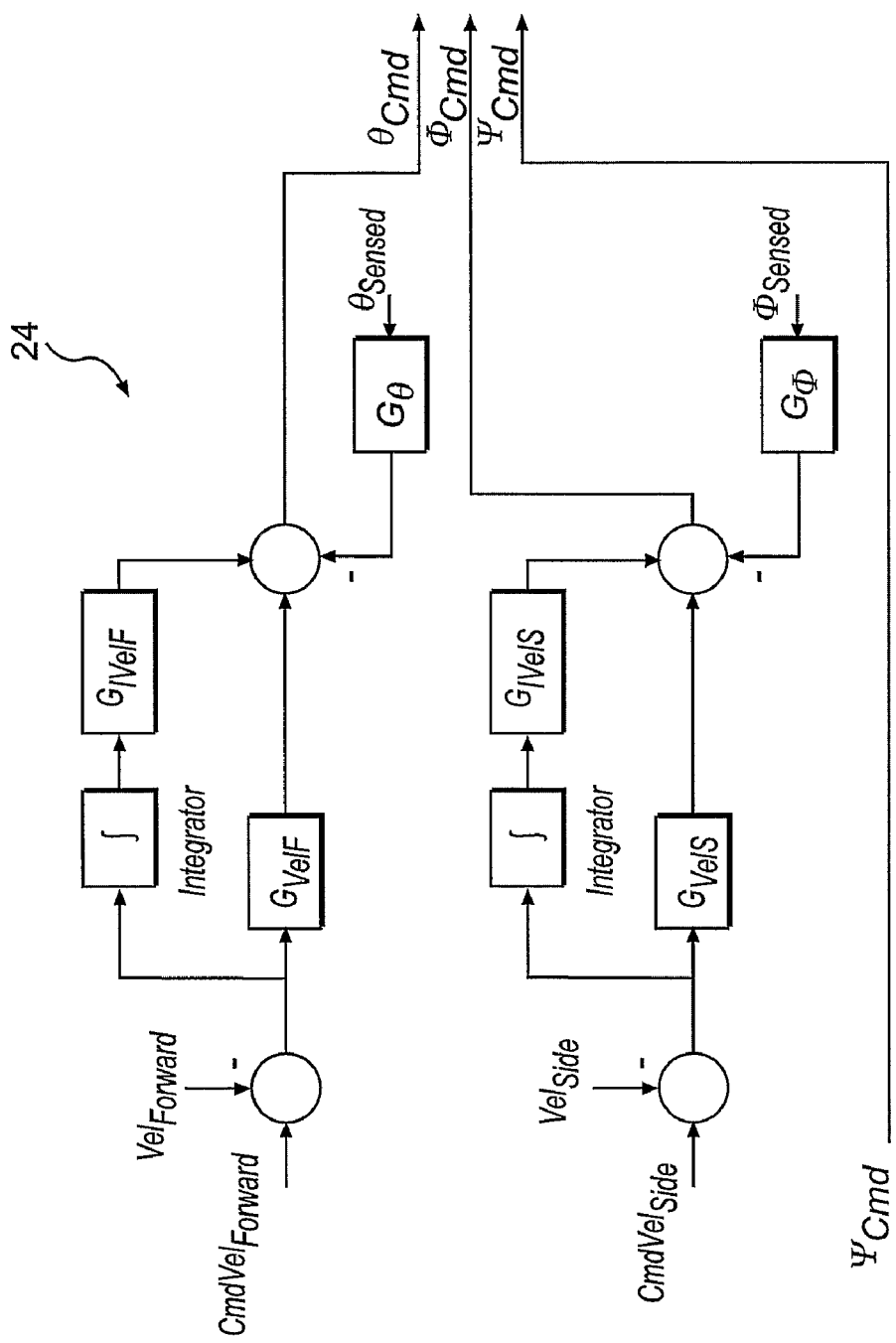
FIG. 4 is a schematic block diagram of an exemplary embodiment of a velocity controller.

FIG. 4 depicts an exemplary embodiment of a velocity controller 24. To control velocity in the NED axes, velocity error loops may be wrapped around the Euler attitude commands, as shown in FIG. 4., which may wrap around the exemplary attitude control loops shown in FIG. 3. Proportional and integral actions may be applied to North and East velocity errors projected through an effective heading $\psi_{Proj}$. Euler angles may act as damping terms.

For example, North and East velocities may be converted to body forward and body side velocities using the following equations:

$$\text{Vel}_F = \text{Vel}_N \cos(\psi_{Proj}) + \text{Vel}_E \sin(\psi_{Proj}); \text{ and/or}$$

$$\text{Vel}_S = -\text{Vel}_N \sin(\psi_{Proj}) + \text{Vel}_E \cos(\psi_{Proj}).$$

The term $\psi_{Proj}$ is the projected X-Z plane heading of the vehicle 10 (see, e.g., FIGS. 1 and 2). In both nose forward and nose up coordinates, $\psi_{Proj} = \psi$.

When the vehicle 10 has the nose near vertical, the commanded side velocity results in a commanded body yaw angle, which is Euler roll for our Euler axis convention, and the commanded forward velocity generates a commanded Euler pitch angle. A third independent command may be given by Euler heading command and may be specified independently. The velocity controller 24 may command Euler pitch and Euler roll using the feedback structure given by the following equations:

$$\theta_{Cmd} = K_\theta \theta_{Sensed} - K_{P1}(CmdVel_{Forward} - Vel_{Forward}) - K_{I1}\int (CmdVel_{Forward} - Vel_{Foward}); \text{ and/or}$$

$$\phi_{Cmd} = -K_\phi \phi_{Sensed} - K_{P2}(CmdVel_{Side} - Vel_{Side}) - K_{I2}\int (CmdVel_{Side} - Vel_{Side}).$$

The two Euler commands $\theta_{Cmd}$ and $\phi_{Cmd}$ may be used for planar velocity control, and when including the third angle, Euler heading $\psi_{Cmd}$, the triad of Euler attitude commands may be used to construct the desired quaternion $\vec{q}_{desired}$. According to some embodiments, each gain may be replaced with, for example, a series of compensators with gains and/or other controller structure, but which may still use the exemplary feedback paths shown in FIGS. 3 and 4.

These three Euler angle commands may be used to generate the desired quaternion vector $\vec{q}_{desired}$, according to the following equation:

$$\vec{q}_{desired} = \text{Euler2Quat}(\phi_{Cmd}, \theta_{Cmd}, \psi_{Cmd}).$$

The term $\phi_{Cmd}$ is the Euler roll command, the term $\theta_{Cmd}$ is the Euler pitch command, and the term $\psi_{Cmd}$ is the Euler heading command. The Euler2Quat function is a known function for converting from Euler angles to a quaternion.

When the vehicle 10 has the nose past vertical and is flying forward, the velocity controller 24 commands pitch from forward velocity, given by the following equation:

$$\theta_{Cmd} = -K_\theta \theta_{Sensed} - K_{P1}(CmdVel_{Forward} - Vel_{Forward}) - K_{I1}\int(CmdVel_{Forward} - Vel_{Forward}).$$

Figure 5:
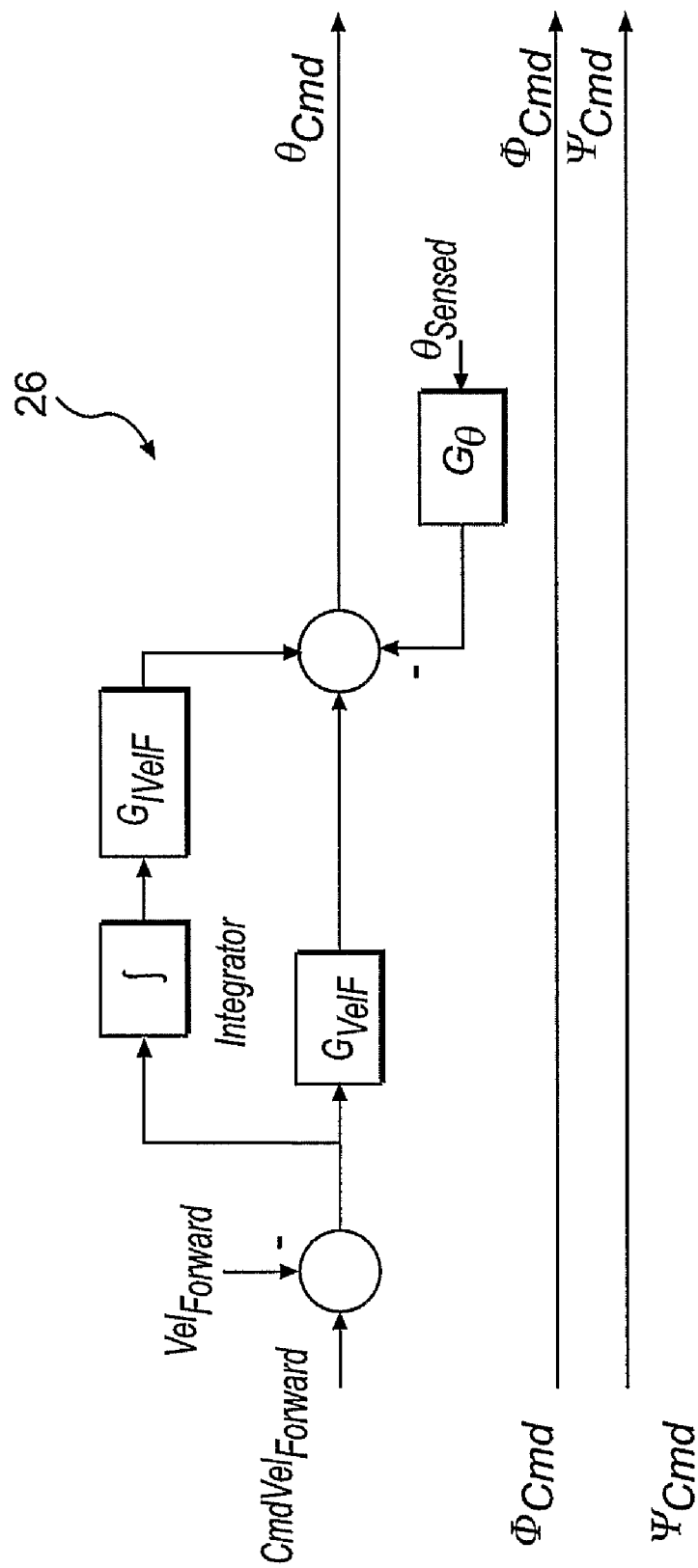
FIG. 5 is a schematic block diagram of an exemplary embodiment of a velocity controller.

FIG. 5 depicts an exemplary embodiment of a velocity controller 26 for a vehicle such as, for example, a missile or a ducted vehicle not having any wings. For such a vehicle, heading $\psi_{Cmd}$ and bank angle $\phi_{Cmd}$ may be chosen arbitrarily. This may permit the vehicle to point a payload by setting the Euler roll command $\phi_{Cmd}$ while turning toward a new heading using the Euler heading command $\psi_{Cmd}$.

On the other hand, for vehicles that cannot support arbitrarily chosen heading and bank angles, such as, for example, a fixed-wing airplane or a ducted vehicle having wings, it may be desirable for the heading and bank angle commands to be kinematically coupled (i.e., it may be desirable to set one as a function of the other according to the dynamics of the vehicle).

Two exemplary methods may be used to keep the bank and heading commands kinematically coupled. The first exemplary method specifies bank angle command and then determines the heading command by integrating the kinematic equations of motion that relate bank angle to turn rate to achieve the new heading command, such as follows:

$$\psi_{Cmd} = \psi_{CmdStart} + \int \frac{g}{U_{TAS}} \sin\phi_{Cmd} \approx \frac{g}{U_{TAS}} \int \phi_{Cmd}.$$

The term $\psi_{CmdStart}$ is a constant initial heading command when bank commands are started. The integration may be analog or digital, for example, using any digital integration approximation. Either the exact form or an approximation given by the above equation may be used.

The second exemplary method specifies the heading as the pilot or higher-level controller command, then derives a roll angle command from the rate of change of heading command, given by the following equation:

$$\phi_{Cmd} = \sin^{-1}\left(\frac{d}{dt}\psi_{Cmd}\frac{U_{TAS}}{g}\right) \approx \frac{U_{TAS}}{g}\frac{d}{dt}\psi_{Cmd}.$$

The differentiation may be analog or digital, for example, using any digital differentiation approximation or method. Either the exact form or an approximation given by the above equation may be used.

The three angles may be used to generate the desired quaternion, whichever exemplary method is used to generate the roll angle $\phi_{Cmd}$ and heading command $\psi_{Cmd}$, according to the following equation:

$$\vec{q}_{desired} = \text{Euler2Quat}(\phi_{Cmd}, \theta_{Cmd}, \psi_{Cmd}).$$

The exemplary methods for deriving bank/roll angle command $\phi_{Cmd}$ from commanded heading $\psi_{Cmd}$ or from heading command $\psi_{Cmd}$ to bank/roll angle command $\phi_{Cmd}$ may be applied also to the direct Euler attitude control of a vehicle and may be inputs for the exemplary velocity controller depicted in FIG. 5.

For controlling some vehicles such as, for example, a ducted fan vehicle, which may be able to take off vertically and switch to forward flight, it may be desirable to switch the desired quaternion vector $\vec{q}_{desired}$ between nose up and nose forward Euler commands received from the pilot or higher level controller. When this switch is made, the attitude error may be preserved, thereby not introducing any transient commands and allowing the quaternion reference to change.

The attitude error matrix may be reconstructed according to the following equation:

$$\Phi = \begin{bmatrix} 0 & -\phi_z & \phi_y \\ \phi_z & 0 & -\phi_x \\ -\phi_y & \phi_x & 0 \end{bmatrix}.$$

The quaternion command may be calculated from the attitude errors and current direction cosine matrix associated with the axes system being used and quaternion being used, according to the following equation:

$$C_{desired} = C_{measured} e^\Phi.$$

Any approximation or numerical method for calculating the above equation may be used. The desired quaternion vector $\vec{q}_{desired}$ at the instant of switching may then be solved by using a standard conversion from the direction cosine matrix to Euler angles, given by the following equation:

$$\vec{q}_{desired} = DC2\text{quat}(C_{desired}).$$

The desired Euler angles may then be determined from the desired quaternion vector $\vec{q}_{desired}$ using the standard conversion.

Since measurements from the navigation filter may be typically kept in a continuous quaternion vector, the measured direction cosine matrix may be determined, for example, by rotating the measured quaternion vector ninety degrees according to known quaternion arithmetic, and then determining the measured direction cosine matrix.

Since the Euler angles have a discontinuity and the quaternion is not unique, by definition, for the two different axes conventions, this mechanism may result in consistent errors to allow any number of switches to occur to and from nose vertical coordinates to nose horizontal coordinates without introducing any discontinuities in the attitude errors. The switch in axis definition may be made at any time between Euler pitch of ninety degrees and Euler pitch of zero degrees. According to some exemplary embodiments, the switch may be made at Euler pitch equal to about forty-five degrees. Hysteresis may be used to switch from nose up Euler commands to nose forward Euler commands by switching from nose up to nose forward at a lower Euler pitch angle than switching back from nose forward to nose up. In at least a similar manner, the exemplary methods described may also apply to the nose down orientation, resulting in a complete all-attitude solution.

Although the exemplary embodiments disclosed herein have been described for exemplary purposes in relation to vehicles such as airplanes, ducted fans, and helicopter flying systems, this disclosure may be applied to any dynamic system that may need to be controlled at any attitude, and in particular, any dynamic system that moves in fixed-world space.

It will be apparent to those skilled in the art that various modifications and variations can be made to the structure and methodology of the present disclosure. Thus, it should be understood that the disclosure is not limited to the examples discussed in the specification. Rather, the present disclosure is intended to cover modifications and variations.

What is claimed is:

1. A control system for controlling velocity and attitude of a dynamic system, the control system comprising:
    a velocity controller configured to receive a desired velocity command and output a velocity error in the form of Euler angle commands; and
    an attitude controller system operatively connected to the velocity controller to receive Euler angle commands, the attitude controller system comprising
        a converter configured to receive the Euler angle commands and output a desired quaternion based on the Euler angle commands,
        an attitude error generator configured to receive the desired quaternion and an estimated quaternion indicative of an estimated attitude of the dynamic system, and is configured to output attitude errors associated with the dynamic system, and
        an attitude controller configured to receive the attitude errors and to output error commands to the dynamic system based on the attitude errors,
    wherein the error commands are configured to reduce the attitude errors and the velocity errors.

2. The control system of claim 1, wherein the attitude controller system is configured to control the dynamic system at all attitudes.

3. The control system of claim 1, wherein the dynamic system comprises a vehicle and the error commands comprise signals configured to adjust control actuators of the vehicle.

4. The control system of claim 3, wherein the vehicle comprises an air vehicle and the control actuators of the vehicle comprise control surfaces.

5. The control system of claim 4, wherein the control actuators comprise at least one of an effective aileron, an effective elevator, and an effective rudder.

6. The control system of claim 4, wherein the air vehicle is configured to take off in a substantially vertical direction and fly in a direction having a horizontal component.

7. The control system of claim 4, wherein the attitude controller system is configured to switch the desired quaternion between a first coordinate system associated with taking off in a substantially vertical direction and a second coordinate system associated with flying in a direction having a horizontal component.

8. The control system of claim 7, wherein the attitude controller system is configured to use hysteresis to prevent chatter as the attitude controller system switches between the first coordinate system and the second coordinate system.

9. The control system of claim 1, wherein the Euler command angles comprise at least one of Euler heading, Euler pitch, and Euler roll.

10. The control system of claim 9, wherein the dynamic system comprises an air vehicle having a nose, wherein when the air vehicle nose is directed in about a horizontal direction, the control system uses only the Euler pitch as a damping term.

11. The control system of claim 9, wherein the dynamic system comprises an air vehicle having a nose, wherein when the air vehicle nose is directed in about a vertical direction, the control system uses only the Euler pitch and the Euler roll as damping terms.

12. The control system of claim 1, wherein the attitude errors by virtue are generated based on the desired quaternion and the estimated quaternion, such that the attitude errors have no discontinuities.

13. The control system of claim 1, wherein the attitude controller system is configured to rotate the estimated quaternion ninety degrees, thereby resulting in a rotated quaternion, such that when the rotated quaternion is converted to Euler angles, non-singular Euler roll, Euler pitch, and Euler heading are produced.

14. The control system of claim 13, wherein the Euler angle commands comprise Euler roll command, Euler pitch command, and Euler heading command, and the attitude controller system is configured to convert the Euler roll command, the Euler pitch command, and the Euler heading command into the desired quaternion and compare the desired quaternion with the rotated quaternion to produce the attitude errors.

15. The control system of claim 14, wherein the attitude errors comprise body axes attitude errors.

16. The control system of claim 1, further comprising a navigation filter configured to generate the estimated quaternion.

17. The control system of claim 16, wherein the navigation filter is configured to use an LTI'zation method in order to control the attitude errors throughout a performance envelope of the dynamic system.

18. The control system of claim 1, wherein the dynamic system comprises a vehicle configured to move along a curvilinear path, and wherein the attitude controller system is configured to control movement of the vehicle along a curvilinear path based solely on one of Euler roll commands and Euler heading commands.

19. The control system of claim 1, wherein the attitude controller system is configured such that when the dynamic system comprises a vehicle not requiring any turn coordination in order to move along a curvilinear path, Euler heading changes are controlled via Euler pitch control regardless of Euler roll orientation.

20. The control system of claim 1, wherein the attitude controller system is configured to control the dynamic system by direct input of Euler angles such that stability of body attitudes of the dynamic system is maintained.

21. An attitude controller system for controlling attitude of a dynamic system, the attitude controller system comprising:

a converter configured to receive a velocity error in the form of Euler angle commands and output a desired quaternion based on the Euler angle commands;

an attitude error generator configured to receive the desired quaternion and an estimated quaternion indicative of an estimated attitude of the dynamic system, and to output attitude errors associated with the dynamic system; and an attitude controller configured to receive the attitude errors and to output error commands to the dynamic system based on the attitude errors, wherein the error commands are configured to reduce the attitude errors and the velocity errors.

22. The attitude controller system of claim 21, wherein the attitude controller system is configured to control the dynamic system at all attitudes.

23. The attitude controller system of claim 21, wherein the dynamic system comprises a vehicle and the error commands comprise signals configured to adjust control actuators of the vehicle.

24. The attitude controller system of claim 23, wherein the vehicle comprises an air vehicle and the control actuators of the vehicle comprise control surfaces.

25. The attitude controller system of claim 24, wherein the control actuators comprise at least one of an effective aileron, an effective elevator, and an effective rudder.

26. The attitude controller system of claim 24, wherein the air vehicle is configured to take off in a substantially vertical direction and fly in a direction having a horizontal component.

27. The attitude controller system of claim 24, wherein the attitude controller system is configured to switch the desired quaternion between a first coordinate system associated with taking off in a substantially vertical direction and a second coordinate system associated with flying in a direction having a horizontal component.

28. The attitude controller system of claim 27, wherein the attitude controller system is configured to use hysteresis to prevent chatter as the attitude controller system switches between the first coordinate system and the second coordinate system.

29. The attitude controller system of claim 21, wherein the Euler command angles comprise at least one of Euler heading, Euler pitch, and Euler roll.

30. The attitude controller system of claim 29, wherein the dynamic system comprises an air vehicle having a nose, wherein when the air vehicle nose is directed in about a horizontal direction, the attitude controller uses only the Euler pitch as a damping term.

31. The attitude controller system of claim 29, wherein the dynamic system comprises an air vehicle having a nose, wherein when the air vehicle nose is directed in about a vertical direction, the attitude controller system uses only the Euler pitch and the Euler roll as damping terms.

32. The attitude controller system of claim 21, wherein the attitude errors have no discontinuities by virtue of being generated based on the desired quaternion and the estimated quaternion.

33. The attitude controller system of claim 21, wherein the attitude controller system is configured to rotate the estimated quaternion ninety degrees, thereby resulting in a rotated quaternion, such that when the rotated quaternion is converted to Euler angles, non-singular Euler roll, Euler pitch, and Euler heading are produced.

34. The attitude controller system of claim 33, wherein the Euler angle commands comprise Euler roll command, Euler pitch command, and Euler heading command, and the attitude controller system is configured to convert the Euler roll command, the Euler pitch command, and the Euler heading command into the desired quaternion and compare the desired quaternion with the rotated quaternion to produce the attitude errors.

35. The attitude controller system of claim 34, wherein the attitude errors comprise body axes attitude errors.

36. The attitude controller system of claim 21, further comprising a navigation filter configured to generate the estimated quaternion.

37. The attitude controller system of claim 36, wherein the navigation filter is configured to use an LTI'zation method in order to control the attitude errors throughout a performance envelope of the dynamic system.

38. The attitude controller system of claim 21, wherein the dynamic system comprises a vehicle, and wherein the attitude controller system is configured to control movement of the vehicle along a curvilinear path based solely on one of Euler roll commands and Euler heading commands.

39. The attitude controller system of claim 21, wherein the attitude controller system is configured such that when the dynamic system comprises a vehicle not requiring any turn coordination in order to move along a curvilinear path, Euler heading changes are controlled via Euler pitch control regardless of Euler roll orientation.

40. The attitude controller system of claim 21, wherein the attitude controller system is configured to control the dynamic system by direct input of Euler angles such that stability of body attitudes of the dynamic system is maintained.

41. A method of controlling velocity and attitude of a dynamic system, the method comprising:

converting a velocity error associated with the dynamic system into Euler angle commands;

converting the Euler angle commands into a desired quaternion;

generating, using an attitude error generator, attitude errors associated with the dynamic system based on the desired quaternion and an estimated quaternion indicative of an estimated attitude of the dynamic system; and controlling the velocity and attitude of the dynamic system to reduce the attitude errors and the velocity errors, wherein the dynamic system comprises a vehicle.

42. The method of claim 41, wherein controlling the velocity and attitude occurs for all attitudes.

43. The method of claim 41, wherein the vehicle comprises actuators, and controlling the velocity and attitude comprises adjusting the actuators.

44. The method of claim 43, wherein the vehicle comprises an air vehicle having control surfaces, and controlling the velocity and attitude comprises adjusting the control surfaces.

45. The method of claim 41, wherein the vehicle comprises an air vehicle, and controlling the dynamic system comprises taking the air vehicle off in a substantially vertical direction and flying the air vehicle in a direction having a horizontal component.

46. The method of claim 45, further comprising switching the desired quaternion between a first coordinate system associated with taking the air vehicle off in a substantially vertical direction and a second coordinate system associated with flying the air vehicle in a direction having a horizontal component.

47. The method of claim 46, further comprising preventing chatter when switching between the first coordinate system and the second coordinate system by using hysteresis.

48. The method of claim 41, further comprising rotating the estimated quaternion ninety degrees to generate a rotated quaternion, and converting the rotated quaternion into Euler angles comprising non-singular Euler roll, Euler pitch, and Euler heading.

49. The method of claim 48, wherein the Euler angle commands comprise Euler roll command, Euler pitch command, and Euler heading command, and wherein the method comprises converting the Euler roll command, the Euler pitch command, and the Euler heading command into the desired quaternion and comparing the desired quaternion with the rotated quaternion to produce the attitude errors.

50. The method of claim 41, wherein the method further comprises controlling movement of the vehicle along a curvilinear path based solely on one of Euler roll commands and Euler heading commands.

51. The method of claim 41, wherein the vehicle comprises a vehicle not requiring any turn coordination in order to move along a curvilinear path, and wherein the method further comprises controlling Euler pitch for any Euler roll orientation in order to change vehicle heading.

52. The method of claim 41, further comprising maintaining the stability of body attitudes of the vehicle while inputting the Euler angle commands and controlling the vehicle.

53. The method of claim 41, wherein controlling the attitude of the vehicle comprises using LTI'zation to control the attitude errors throughout an operational envelope of the vehicle.

* * * * *